US012627645B2

(12) United States Patent
Weinstein et al.

(10) Patent No.: US 12,627,645 B2
(45) Date of Patent: May 12, 2026

(54) PROTECTING INTELLECTUAL PROPERTY USING DIGITAL SIGNATURES

(71) Applicant: BLACK DUCK SOFTWARE, INC., Burlington, MA (US)

(72) Inventors: Damon A. Weinstein, Arlington, MA (US); Kathleen E. Simmons, Pepperell, MA (US); Mayur Kadu, Burlington, MA (US); Jay Ricco, Arllington, MA (US); Jagat Prakashchandra Parekh, Andover, MA (US); Sai keerthy Kakarla, Burlington, MA (US); Matthew Fenwick, Woburn, MA (US)

(73) Assignee: Black Duck Software, Inc., Burlington, MA (US)

( * ) Notice: Subject to any disclaimer, the term of this patent is extended or adjusted under 35 U.S.C. 154(b) by 194 days.

(21) Appl. No.: 18/601,927

(22) Filed: Mar. 11, 2024

(65) Prior Publication Data

US 2025/0286872 A1     Sep. 11, 2025

(51) Int. Cl.
*H04L 9/40* (2022.01)

(52) U.S. Cl.
CPC .............. *H04L 63/08* (2013.01); *H04L 63/20* (2013.01)

(58) Field of Classification Search
CPC ...... H04L 63/08; H04L 63/20; H04L 63/1416
See application file for complete search history.

(56) References Cited

U.S. PATENT DOCUMENTS

| | | | | |
|---|---|---|---|---|
| 6,363,479 B1 * | 3/2002 | Godfrey | ............... | H04L 63/126 |
| | | | | 380/37 |
| 7,047,173 B1 * | 5/2006 | Larky | ................... | G06F 30/367 |
| | | | | 716/136 |
| 8,204,984 B1 * | 6/2012 | Aziz | ................... | H04L 63/0227 |
| | | | | 709/224 |

(Continued)

FOREIGN PATENT DOCUMENTS

WO     WO-2020112101 A1 *   6/2020   ......... G06F 21/6218

OTHER PUBLICATIONS

International Search Report and Written Opinion, International Application No. PCT/US2025/017848, dated Apr. 17, 2025.

(Continued)

*Primary Examiner* — Aravind K Moorthy
(74) *Attorney, Agent, or Firm* — Patterson + Sheridan, LLP

(57) ABSTRACT

Methods of protecting intellectual property using digital signatures include generating reference digital signatures of first content, generating a digital signature of second content, comparing the digital signature of the second content to the reference digital signatures to identify matching reference digital signatures, and selectively performing an action based on the matching reference digital signatures and a policy. The first content may include proprietary information of an organization and/or posts of a machine-learning (ML) model. The second content may include source code intercepted from a transmission directed to an external site, such as a ML model, and/or source code saved to a source code repository. Actions may include, without limitation, initiat- (Continued)

ing an audit of the second content, sending a notification to a user interface indicating that the second content likely contains a portion of the first content, releasing the transmission, and/or terminating the transmission.

18 Claims, 8 Drawing Sheets

(56)                    References Cited

U.S. PATENT DOCUMENTS

| | | | |
|---|---|---|---|
| 9,536,101 B1 * | 1/2017 | Demov | G06F 21/53 |
| 9,547,657 B2 | 1/2017 | Weinstein et al. | |
| 9,838,494 B1 * | 12/2017 | Tomasiewicz | G06F 16/9574 |
| 10,437,588 B1 * | 10/2019 | Crawford | G06F 8/73 |
| 10,652,266 B1 * | 5/2020 | Tautschnig | H04L 63/1441 |
| 10,678,677 B1 * | 6/2020 | Kuris | G06F 11/3698 |
| 10,809,992 B1 * | 10/2020 | Kondo | G06F 21/64 |
| 11,057,215 B1 * | 7/2021 | Miller | H04L 9/0643 |
| 11,128,737 B1 * | 9/2021 | Fox | G06N 3/0499 |
| 11,182,691 B1 * | 11/2021 | Zhang | G06N 20/20 |
| 11,349,670 B1 * | 5/2022 | Miller | G06F 21/64 |
| 11,416,224 B1 * | 8/2022 | Kaitha | G06F 8/36 |
| 11,463,264 B2 * | 10/2022 | Ngo | H04L 63/10 |
| 11,563,753 B2 * | 1/2023 | Khurana | H04L 63/20 |
| 11,792,162 B1 * | 10/2023 | Grover | H04L 63/1416 |
| | | | 726/1 |
| 11,810,205 B1 * | 11/2023 | Chan | G06F 9/451 |
| 11,893,045 B1 * | 2/2024 | Feng | G06F 16/355 |
| 12,032,901 B1 * | 7/2024 | Reigis | G06F 8/75 |
| 12,063,251 B1 * | 8/2024 | Breger | H04L 69/22 |
| 12,405,877 B1 * | 9/2025 | Tripp | G06F 11/3604 |
| 12,423,578 B1 * | 9/2025 | Zheng | G06N 3/063 |
| 12,461,719 B2 * | 11/2025 | Wang | G06F 8/34 |
| 12,463,987 B1 * | 11/2025 | Shahrivar | H04L 63/1416 |
| 2003/0174841 A1 * | 9/2003 | Nault | H04L 67/02 |
| | | | 380/277 |
| 2006/0002334 A1 * | 1/2006 | Washburn | H04W 12/062 |
| | | | 370/328 |
| 2007/0250930 A1 * | 10/2007 | Aziz | H04L 63/145 |
| | | | 726/24 |
| 2008/0010680 A1 * | 1/2008 | Cao | H04L 63/1416 |
| | | | 726/23 |
| 2008/0232275 A1 * | 9/2008 | Eswaran | H04L 45/48 |
| | | | 370/256 |
| 2008/0270991 A1 | 10/2008 | Zeidman | |
| 2008/0276294 A1 * | 11/2008 | Brady | H04W 12/02 |
| | | | 726/1 |
| 2011/0145360 A1 * | 6/2011 | Sheshagiri | G06F 9/547 |
| | | | 717/110 |
| 2013/0254838 A1 | 9/2013 | Ahuja et al. | |
| 2013/0339390 A1 * | 12/2013 | Muller | G06F 16/185 |
| | | | 707/782 |
| 2014/0283081 A1 * | 9/2014 | Sheridan | G06F 21/564 |
| | | | 726/25 |
| 2015/0302198 A1 * | 10/2015 | Payne | G06F 21/562 |
| | | | 726/23 |
| 2016/0021211 A1 * | 1/2016 | Yellin | H04L 67/535 |
| | | | 709/203 |
| 2016/0321069 A1 * | 11/2016 | Chen | G06F 8/20 |
| 2016/0352524 A1 * | 12/2016 | Kinney | H04L 63/0876 |
| 2017/0060575 A1 * | 3/2017 | Agrawal | G06F 8/65 |
| 2017/0244713 A1 * | 8/2017 | Sun | G06F 21/125 |
| 2017/0295180 A1 * | 10/2017 | Day | H04L 9/0836 |
| 2018/0013569 A1 * | 1/2018 | Knopf | H04L 9/321 |
| 2018/0077189 A1 * | 3/2018 | Doppke | H04L 63/20 |
| 2018/0331832 A1 * | 11/2018 | Pulsifer | H04L 9/3247 |
| 2019/0042395 A1 * | 2/2019 | Tian | G06F 11/3656 |
| 2019/0068746 A1 * | 2/2019 | Bhatnagar | H04L 63/062 |
| 2019/0171767 A1 * | 6/2019 | Bolla | G06F 16/9535 |
| 2019/0182053 A1 | 6/2019 | Varpiola et al. | |
| 2019/0286973 A1 * | 9/2019 | Kovvuri | G06N 3/0495 |
| 2019/0303109 A1 * | 10/2019 | Fu | G06F 18/295 |
| 2019/0317743 A1 * | 10/2019 | Cremeans | G06F 8/73 |
| 2020/0059452 A1 * | 2/2020 | Ravichandran | H04W 12/122 |
| 2020/0195495 A1 * | 6/2020 | Parker | H04L 41/40 |
| 2020/0274887 A1 * | 8/2020 | Zaw | H04L 63/1441 |
| 2020/0351286 A1 * | 11/2020 | Ahuja | H04L 43/028 |
| 2020/0358621 A1 | 11/2020 | Ngo | |
| 2020/0371651 A1 * | 11/2020 | Lau | G06F 8/65 |
| 2020/0389491 A1 * | 12/2020 | Buck | G06F 21/88 |
| 2021/0056547 A1 * | 2/2021 | Monica | G06Q 20/3672 |
| 2021/0056548 A1 * | 2/2021 | Monica | G06Q 20/38215 |
| 2021/0119968 A1 * | 4/2021 | Schibuk | H04L 63/0236 |
| 2021/0185059 A1 * | 6/2021 | Achleitner | G06F 16/355 |
| 2021/0241276 A1 * | 8/2021 | Mossoba | G06Q 20/4012 |
| 2021/0243204 A1 * | 8/2021 | Taylor | H04L 63/1408 |
| 2021/0367966 A1 * | 11/2021 | Yanay | H04L 63/083 |
| 2021/0377216 A1 * | 12/2021 | Cohen | H04L 9/3247 |
| 2021/0377224 A1 * | 12/2021 | Soriente | H04L 9/3234 |
| 2021/0400083 A1 * | 12/2021 | Stokes | H04L 43/12 |
| 2022/0103376 A1 * | 3/2022 | Lu | H04L 9/3226 |
| 2022/0156053 A1 * | 5/2022 | Shaastry | G06F 8/71 |
| 2022/0278832 A1 * | 9/2022 | Wiseman | H04L 9/3247 |
| 2022/0300856 A1 * | 9/2022 | Archuleta | G06F 18/295 |
| 2022/0405091 A1 * | 12/2022 | Mahanta | G06N 3/10 |
| 2023/0009127 A1 * | 1/2023 | Boyer | H04L 63/1441 |
| 2023/0016602 A1 * | 1/2023 | Vuggrala | H04L 9/3247 |
| 2023/0069731 A1 * | 3/2023 | Chen | H04L 63/0263 |
| 2023/0161642 A1 * | 5/2023 | Adogla | G06F 9/541 |
| | | | 719/328 |
| 2023/0199006 A1 * | 6/2023 | Gurnov | H04L 63/1425 |
| | | | 726/23 |
| 2023/0254338 A1 * | 8/2023 | Melicher | G06F 16/951 |
| | | | 726/13 |
| 2023/0275764 A1 * | 8/2023 | Manning | H04L 9/3247 |
| | | | 713/176 |
| 2023/0289148 A1 * | 9/2023 | Wang | G06F 8/34 |
| 2023/0368000 A1 * | 11/2023 | Cox | G10L 25/30 |
| 2023/0393847 A1 * | 12/2023 | Closset | G06F 8/36 |
| 2023/0412449 A1 * | 12/2023 | Kannan | H04L 41/0604 |
| 2024/0039911 A1 * | 2/2024 | Millar | H04L 41/06 |
| 2024/0056457 A1 * | 2/2024 | Bouchard | H04L 63/1416 |
| 2024/0070261 A1 * | 2/2024 | Bin Huraib | G06F 21/566 |
| 2024/0104001 A1 * | 3/2024 | Clement | G06N 3/044 |
| 2024/0129740 A1 * | 4/2024 | Pathania | H04L 63/1416 |
| 2024/0168744 A1 * | 5/2024 | Mohan | G06F 8/71 |
| 2024/0171379 A1 * | 5/2024 | Mano | H04L 63/0435 |
| 2024/0329978 A1 * | 10/2024 | Stapleton | H04L 9/3297 |
| 2024/0330481 A1 * | 10/2024 | Roytman | H04L 63/1483 |
| 2024/0333741 A1 * | 10/2024 | Abdelrahman | G06Q 20/382 |
| 2024/0333759 A1 * | 10/2024 | Zhang | H04L 63/1425 |
| 2024/0356978 A1 * | 10/2024 | Akali | H04L 63/0227 |
| 2024/0361996 A1 * | 10/2024 | Fu | G06F 8/73 |
| 2024/0388600 A1 * | 11/2024 | Du | H04L 63/20 |
| 2024/0411866 A1 * | 12/2024 | Djeyassilane | G06F 21/552 |
| 2024/0414175 A1 * | 12/2024 | Jiang | H04L 63/1425 |
| 2025/0004727 A1 * | 1/2025 | Rudnik | G06F 8/33 |
| 2025/0004734 A1 * | 1/2025 | Mishra | G06F 8/437 |
| 2025/0004754 A1 * | 1/2025 | Walluck | G06F 8/71 |
| 2025/0037003 A1 * | 1/2025 | Kurian | G06N 20/00 |
| 2025/0039192 A1 * | 1/2025 | Bachar | H04L 63/1433 |
| 2025/0039217 A1 * | 1/2025 | Bachar | H04L 63/20 |
| 2025/0047695 A1 * | 2/2025 | Xu | H04L 63/1425 |
| 2025/0055765 A1 * | 2/2025 | Soldati | H04L 41/40 |
| 2025/0080571 A1 * | 3/2025 | Jaganathan | H04L 63/1441 |
| 2025/0094642 A1 * | 3/2025 | Haimov | G06F 21/604 |
| 2025/0103325 A1 * | 3/2025 | Fu | G06F 8/33 |
| 2025/0175462 A1 * | 5/2025 | Mukherjee | H04L 63/0861 |
| 2025/0247213 A1 * | 7/2025 | Cain | H04L 9/3236 |
| 2025/0265129 A1 * | 8/2025 | Sawal | G06F 9/5072 |
| 2025/0286872 A1 * | 9/2025 | Weinstein | H04L 63/08 |

OTHER PUBLICATIONS

Synopsys User Guide Black Duck dated Oct. 10, 2023, consists of 546 pages.

* cited by examiner

200

202
Generate digital signatures of reference content

204
Generate a digital signature(s) of user content

206
Compare the digital signature(s) of the user content to the digital signatures of the reference content to identify matching digital signatures of the reference content 208
Match results meet a criterion for an action?     No Yes 210
Perform/initiate the action

PROTECTING INTELLECTUAL PROPERTY USING DIGITAL SIGNATURES

TECHNICAL FIELD

The present disclosure generally relates to a computer security system. In particular, the present disclosure relates to protecting intellectual property through the use of digital signatures.

BACKGROUND

Generative artificial intelligence machine learning (AIML) models, such as large language models (LLMs), are rapidly proliferating. LLMs are language models built upon neural networks containing billions of parameters trained to generate textual content, including computer source code.

Publicly-accessible LLMs pose privacy and security risks. For example, an employee of an organization may submit proprietary source code to a publicly-accessible LLM for training purposes and/or to improve the source code. An LLM may, however, provide an indication of and/or disclose information on which the LLM was trained.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
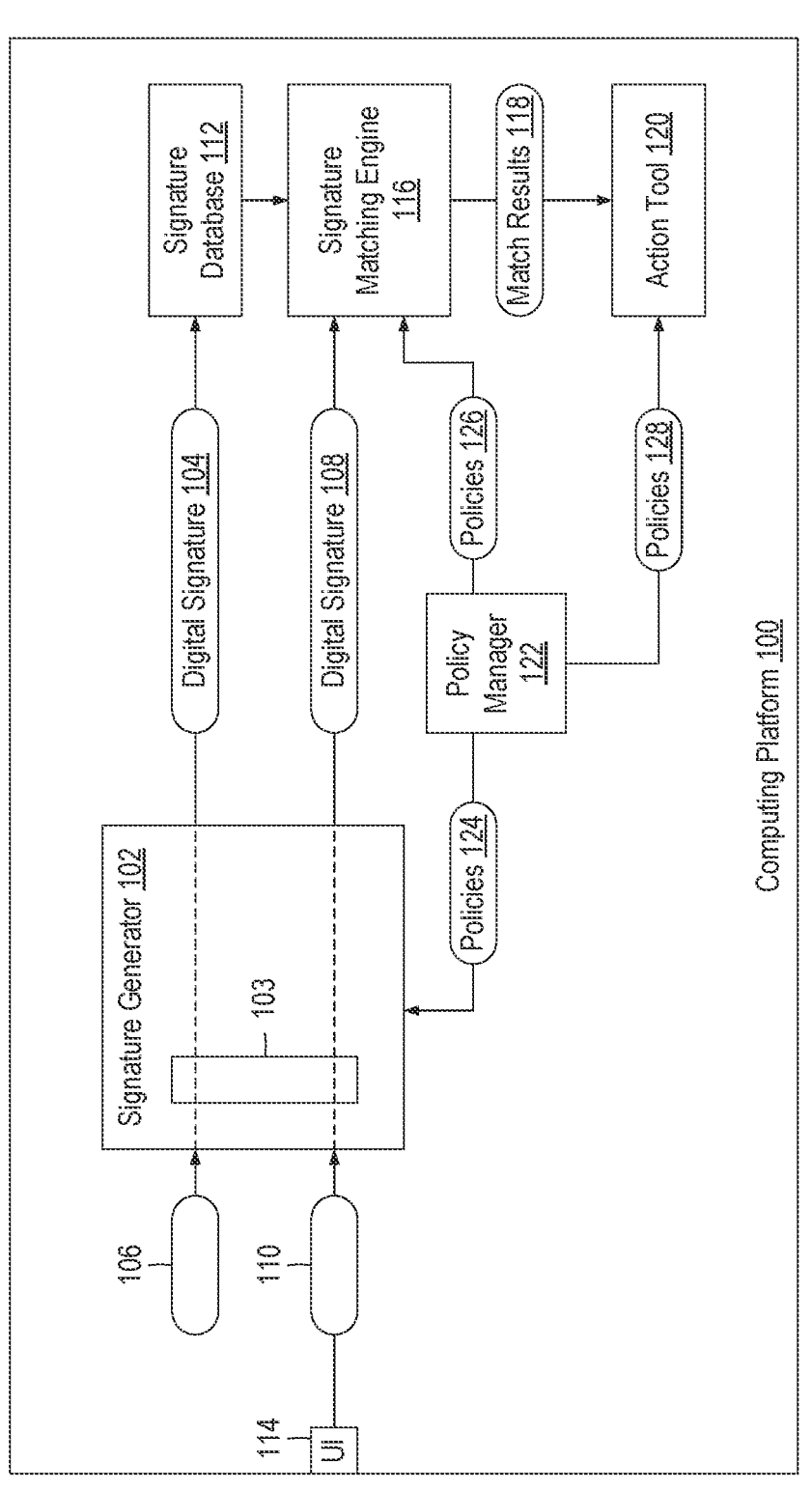
FIG. 1 is a block diagram of a computing platform for protecting intellectual property through the use of digital signatures, according to an embodiment.

Aspects of the present disclosure relate to protecting intellectual property through the use of digital signatures.

An organization/entity may generate proprietary information (i.e., intellectual property) related to products, services, and/or customers, which may include designs/inventions (e.g., source code and/or circuit designs), marketing materials, customer lists, employee information, legal documents, and/or other content, and/which may be embodied as digitized text, images, video, and/or audio.

An organization may want to identify proprietary information contained in outgoing correspondence and/or identify internal contributions to proprietary information, such as to identify contributions of a machine-learning (ML) model (e.g., ML-generated source code). An organization may also want to perform automated actions (e.g., initiate audits, issue warnings, and/or block transmissions of content to external networks). The sheer quantity and complexity of proprietary information may make it technically challenging to determine whether such content includes proprietary information, and/or to identify internal contributions (e.g., of a ML model).

In an example, protecting intellectual property through the use of digital signatures includes generating a database of digital signatures of proprietary content, generating a digital signature of a user post directed to an external network, comparing the digital signature of the user post to the database of digital signatures to determine if the user post contains or likely contains proprietary information, and selectively performing one or more actions configurable policies if the user post contains or likely contains proprietary information. The digital signatures may be generated using, for example and without limitation, piecewise hashing, rolling hashes, Merkle trees, Simhash, Minhash, content defined chunking (CDC), differential hashing, shingling, and/or combinations thereof. The one or more actions may be performed by a processing device and include, without limitation, initiating an audit of the user post, terminating transmission of the user post, alerting a user that the user post contains or likely contains proprietary content, and/or permitting the user to terminate transmission of the user post.

In another example, protecting intellectual property through the use of digital signatures includes generating a database of digital signatures of posts/outputs of a ML model (e.g., an internal/proprietary ML model and/or an external/public ML model), generating a digital signature of source code submitted to a source code repository and comparing it to the database of digital signatures to quickly and efficiently identify source code that contains or likely contains posts of the ML model, and selectively performing one or more actions based on the comparison. Actions may include, without limitation, initiating an audit of the source code and/or alerting a user that the source code contains or likely contains posts of the ML model.

Protecting intellectual property through the use of digital signatures may further include configurable policies. In an example, configurable policies define one or more types of actions and criteria that specify conditions (e.g., thresholds) for performing the actions. In another example, configurable policies specify one or more types of digital signatures to generate and/or to compare, and/or one or more levels of granularity at which to generate and/or compare digital signatures. In another example, configurable policies specify content for which digital signatures are to be captured, a frequency (e.g., a schedule) at which a digital signature database is to be updated. In another example, configurable policies relate to IP (e.g., content) leakage risk identification.

Technical advantages of the present disclosure include, but are not limited to, improvements in functions/operations of a computing platform. For example, and without limitation, although digital signatures may be computed based on the entire contents of computer files. For relatively large files and/or relatively numerous files, however, this may require significant computational resources and storage capacity. As disclosed herein, digital signatures may be computed based on portions (i.e., snippets) of file contents, descriptors of files and/or file directory structures, and/or metadata, at one or more configurable/selectable levels of granularity (e.g., based on configurable policies), with fewer computational resources and reduced storage capacity. Levels of granularity may be configured/selected to control accuracy versus efficiency (i.e., higher accuracy may utilize more computing resources/time).

Technical advantages of the present disclosure further include, but are not limited to, improvements in functions/ operations of automated tools for protecting intellectual property, including automated audit initiation, automated user notifications, and/or automated pausing/termination of user posts directed to external networks.

FIG. 1 is a block diagram of a computing platform 100 for protecting intellectual property through the use of digital signatures, according to an embodiment. Computing platform 100 may include circuitry (e.g., logic gates and/or a processor and memory). Computing platform 100 may represent a single computing platform or multiple computing platforms, which may be centralized or distributed. An example of computing platform 100 is provided further below with reference to FIG. 8.

In the example of FIG. 1, computing platform 100 includes a signature generator 102 that generates digital signatures 104 of reference content 106, and a digital signature(s) 108 of user content 110. Reference content 106 and user content 110 may include, for example and without limitation, digitized human-readable content (e.g., source code), binary files (e.g., machine-readable code compiled from source code), digitized images, digitized video, and/or digitized audio.

Computing platform 100 further includes a signature matching engine 116 that compares digital signature 108 of user content 110 to digital signatures 104 of reference content 106, and outputs match results 118.

Computing platform 100 further includes an action tool 120 that selectively performs one or more actions based on match results 118. As an example, and without limitation, action tool 120 may initiate an audit of user content 210 if match results 118 meet a criterion. Additional examples are provided further below.

Computing platform 100 may further include a signature database 112 that stores digital signatures 104, a user interface (UI) 114 that receives user content 110 from a user, and/or a policy manager 122 that manages policies 124, 126, and 128 for signature generator 102, signature matching engine 116, and action tool 120, respectively.

Figure 2:
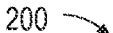
FIG. 2 illustrates a method of protecting intellectual property through the use of digital signatures, according to an embodiment.
Figure 2:
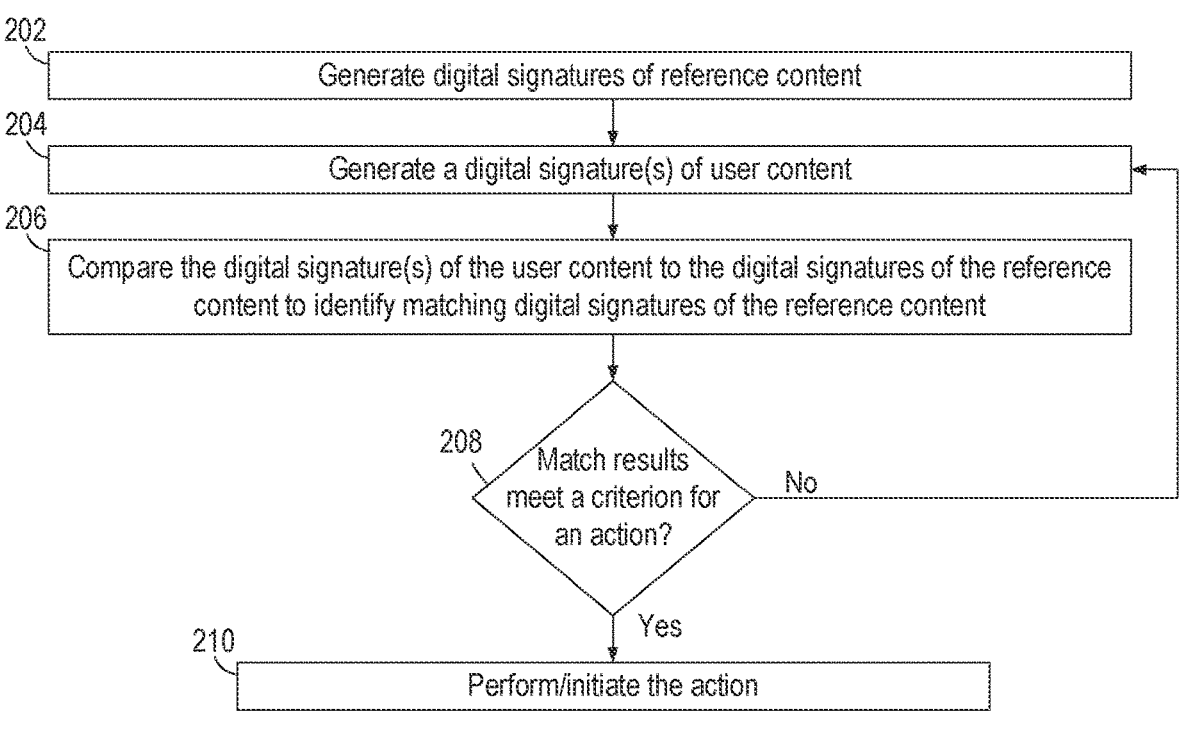

FIG. 2 illustrates a method 200 of protecting intellectual property through the use of digital signatures, according to an embodiment. Method 200 is described below with reference to FIG. 1. Method 200 is not, however, limited to the example of FIG. 1.

At 202, signature generator 102 generates digital signatures 104 of reference content 106.

Signature generator 102 may generate digital signatures 104 for units of reference content 106, where a unit of reference content 106 may correspond to a single computer file or a group of related computer files (e.g., arranged in hierarchical and/or directory-based structures). As an example, and without limitation, source code may include multiple related/linked computer files (e.g., libraries), which may be treated as a unit of reference content 106.

Signature generator 102 may generate digital signatures 104 at one or more levels of granularity. At a most detailed level of granularity, signature generator 102 may generate a digital signature 104 based on the entire contents of a unit of reference content 106. At less granular levels of granularity, signature generator 102 may construct a string of information/features related to a unit of reference content 106, and may generate a digital signature 104 of the string. Features may include, for example and without limitation, one or more portions (i.e., segments or snippets) of contents of a unit of reference content 106 and/or metadata/descriptors of the unit of reference content 106. Metadata/descriptions may include, for example, and without limitation, file names, file size, time/date stamps, authors, descriptions of directory structures, and/or other information. Signature generator 102 may include a feature extractor 103 that extracts features of reference content 106 and arranges the extracted features in a string based on policies 124.

Signature generator 102 may generate multiple digital signatures 104 for a unit of reference content 106, at multiple respective levels of granularity. Signature generator 102 may, for example, construct multiple strings for a unit of reference content 106, where a first string (i.e., a least granular string) includes relatively few features (e.g., relatively few and/or relatively short snippets, and/or relatively little/few metadata/descriptors), and where and each subsequent string contains progressively more features (e.g., more and/or longer snippets and/or more metadata/descriptors), and/or various combinations of features. Signature generator 102 may generate a digital signature 104 for each string. Levels of granularity may be configurable (e.g., via policies 124 and 126). Levels of granularity may be configured/ selected to control accuracy versus efficiency (i.e., higher accuracy/more granularity may utilize more computing resources/time).

Signature generator 102 may compute one or more types of digital signatures based on one or more encoding schemes, such as a cyclic redundancy check (CRC) code, and/or a hash function that maps data of arbitrary size to a fixed-size value, which may be referred to as a hash value, a hash code, a hash digest, a digest, or a hash. Signature generator 102 is not limited to CRC codes or hash functions.

Signature generator 102 may compute digital signatures based on policies 124, which may specify an encoding scheme(s) and features to use in determining digital signatures.

At 204, signature generator 102 generates digital signature(s) 108 of user content 110, such as described above with respect to digital signatures 104. In one embodiment, the digital signature generation method for user content 110 is the same as the digital signature generation method for reference content 106.

At 206, signature matching engine 116 compares digital signature 108 of user content 110 to digital signatures 104 of reference content 106 to identify digital signatures 104 that match digital signature(s) 108 (i.e., matching digital signatures).

Where signature generator 102 determines digital signatures 104 and 108 based on descriptors, metadata, and/or snippets, the digital signatures may not necessarily be unique. In such a situation, signature matching engine 116 may identify matching digital signatures for which the corresponding proprietary content 106 does not precisely match user post 110. In this example, match results 118 may indicate a quantity/number of matching digital signatures, which may be indicative of a likelihood that user content 110 includes a portion of reference content 106.

Where signature generator 102 determines multiple types of digital signatures and/or digital signatures at multiple levels of granularity, signature matching engine 116 may initially compare digital signatures of a first type or first level of granularity (e.g., a least granular level) (e.g., based on policies 126). If the quantity/number of matching digital signatures meets a threshold, signature matching engine 116 may compare digital signatures 104 and 108 corresponding to a lower/more-detailed level of granularity to reduce the number/quantity of matching digital signatures.

Signature generator 102 and signature matching engine 115 may utilize features/methods of signature/snippet/code-print matching tools designed to detect open-source code within source code of an organization, and/or signature matching tools designed to detect security vulnerabilities in source code.

At 208, action tool 120 selectively performs one or more actions based on match results 118 and policies 128, examples of which are provided further below.

Figure 3:
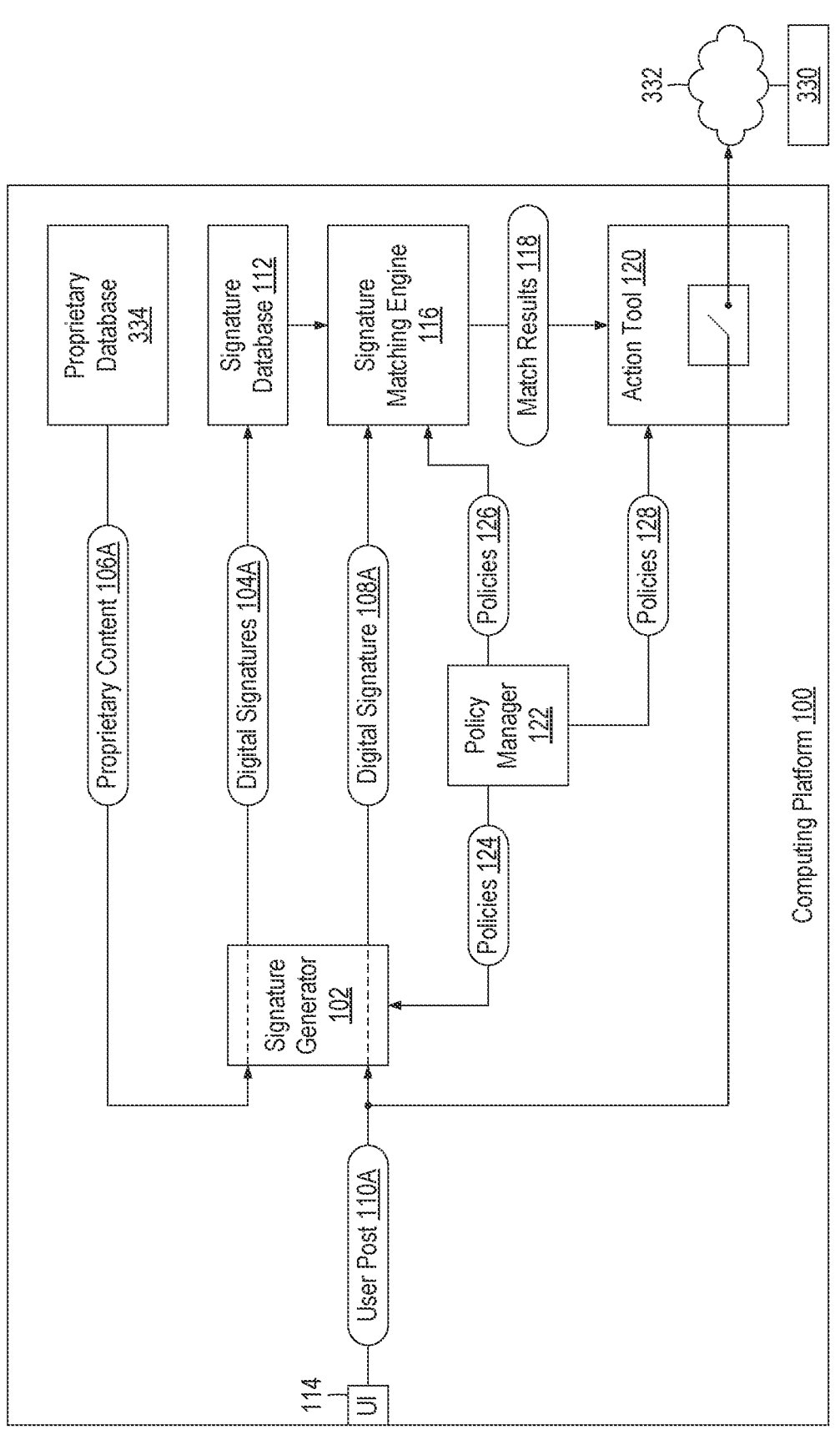
FIG. 3 is another block diagram of the computing platform, according to an embodiment.

FIG. 3 is another block diagram of computing platform 100, according to an embodiment. In the example of FIG. 3, reference content 106 includes proprietary content 106A of an organization, and user content 110 includes a user post 110A directed to an external site 330 via an external network 332 (e.g., the Internet). Computing platform 100 may further include a proprietary database 334 that stores proprietary content 106A. The example of FIG. 3 may be useful to identify user posts that contains proprietary source code, and to take actions based on configurable policies.

In an example, proprietary content 106A includes proprietary source code of an entity/organization, external site 330 represents an external/public generative artificial intelligence machine learning (AIML) model, such as a large language model (LLM), and user post 110A includes source code. In this example, a user may transmit source code to the generative AI model for training purposes and/or to have the generative AI model identify bugs, improve efficiency, and/or to provide alternative code. The example of FIG. 3 may be useful to identify source code of user post that contains proprietary source code, and to take actions based on configurable policies. The example of FIG. 3 is further described below with reference to FIG. 4.

Figure 4:
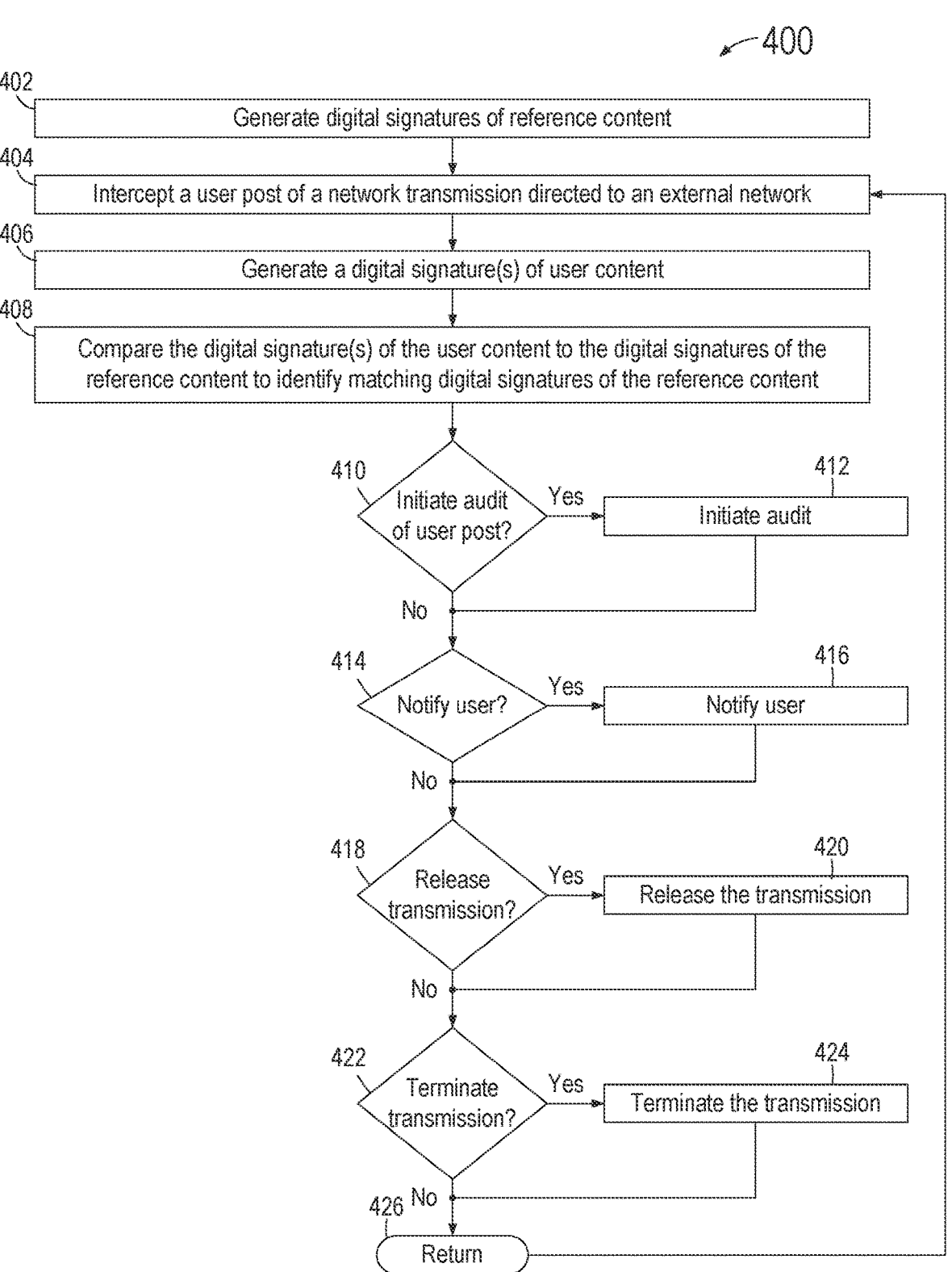
FIG. 4 illustrates another method of protecting intellectual property through the use of digital signatures, according to an embodiment.

FIG. 4 illustrates a method 400 of protecting intellectual property through the use of digital signatures, according to an embodiment. Method 400 is described below with reference to FIG. 3. Method 400 is not, however, limited to the example of FIG. 3.

At 402, signature generator 102 generates digital signatures 104 of proprietary content 106A, such as described above with reference to 202 of method 200.

At 404, action tool 120 intercepts user post 110A from user interface 114 (e.g., a browser). Action tool 120 may also pause the transmission of user post 110A to external network 232 as a safety precaution.

At 406, signature generator 102 generates a digital signature(s) 108A of user post 110A. Signature generator 102 may generate digital signature(s) 108A as described above with respect to 204 of method 200.

At 408, signature matching engine 116 compares digital signature(s) 108A of user post 110A to digital signatures 104A of proprietary content 106A to identify matching digital signatures, such as described above with reference to 206 of method 200. Thereafter, action tool 120 may perform one or more actions based on match results 118 and policies 128, examples of which are provided below with reference to 410 through 424.

At 410, action tool 120 determines whether to initiate an audit of user post 110A. Action tool 120 may determine to initiate an audit if match results 118 meet a criterion. As an example, match results 118 may provide a number/quantity of matching digital signatures, and the criterion may specify a threshold number of matching digital signatures. If the number/quantity of matching digital signatures meets the threshold, action tool 120 may determine to initiate an audit of user post 110A. If action tool 120 determines to initiate an audit of user post 110A, processing proceeds to 412.

At 412, action tool 120 may capture information for the audit. As an example, and without limitation, action tool 120 may capture user post 110A, a user identifier associated with user post 110A, a time-stamp associated with user post 110A, digital signature 108A of user post 110A, matching digital signatures 104A, and/or proprietary content 106A corresponding to the matching digital signatures 104A.

At 414, action tool 120 may determine whether to send a notification to UI 114 based on match results 118 and policies 128. As an example, action tool 120 may determine to send a notification if the number/quantity of matching digital signatures 104A meet the threshold. If action tool 120 determines send a notification, processing proceeds to 416.

At 416, action tool 120 sends a notification to UI 114. The notification may include a notice that user post 110A contains or likely contains proprietary content (e.g., proprietary source code). The notification may also include a list of optional actions. If action tool 120 paused the transmission at 404, the notification may include a link that permits the user to release (i.e., un-pause) or terminate the transmission.

At 418, if action tool 120 paused the transmission of user post 110A at 404, action tool 120 may determine whether to release (i.e., un-pause) the transmission based on match results 118 and policies 128. As an example, action tool 120 may determine to release the transmission if match results 118 do not meet the threshold. If action tool 120 determines to release the transmission, processing proceeds to 420, where action tool 120 releases the transmission.

At 422, if action tool 120 paused the transmission of user post 110A at 404, action tool 120 may determine whether to terminate the transmission based on match results 118 and policies 128. As an example, action tool 120 may determine to terminate the transmission if match results 118 meet the threshold, or another threshold. If action tool 120 determines to terminate the transmission, processing proceeds to 424, where action tool 120 terminates the transmission.

Action tool 120 may perform various combinations of actions described, a subset thereof, and/or other actions. Additional examples are provided below. Action tool 120 is not limited to the foregoing examples or the following examples.

In an example, action tool 120 pauses the transmission at 404, releases the transmission if match results 118 do not meet a first threshold. Action tool 120 may further initiate an audit of user post 110A and send an alert to UI 114, such as described above. If match results 118 meet a second threshold that is higher than the first threshold (i.e., indicating a higher likelihood that user post 110A contains proprietary content), action tool 120 may terminate the transmission. If match results 118 fall between the first and second thresholds, action tool 120 may permit the user to select whether to release or terminate the transmission. In another example, action tool 120 does not pause the transmission of user post 110A at 404. Action tool 120 is not limited to the foregoing examples.

At 426, processing may return to 404 for interception of other user posts and/or to 402 for generation of digital signatures 104A of other proprietary content.

Figure 5:
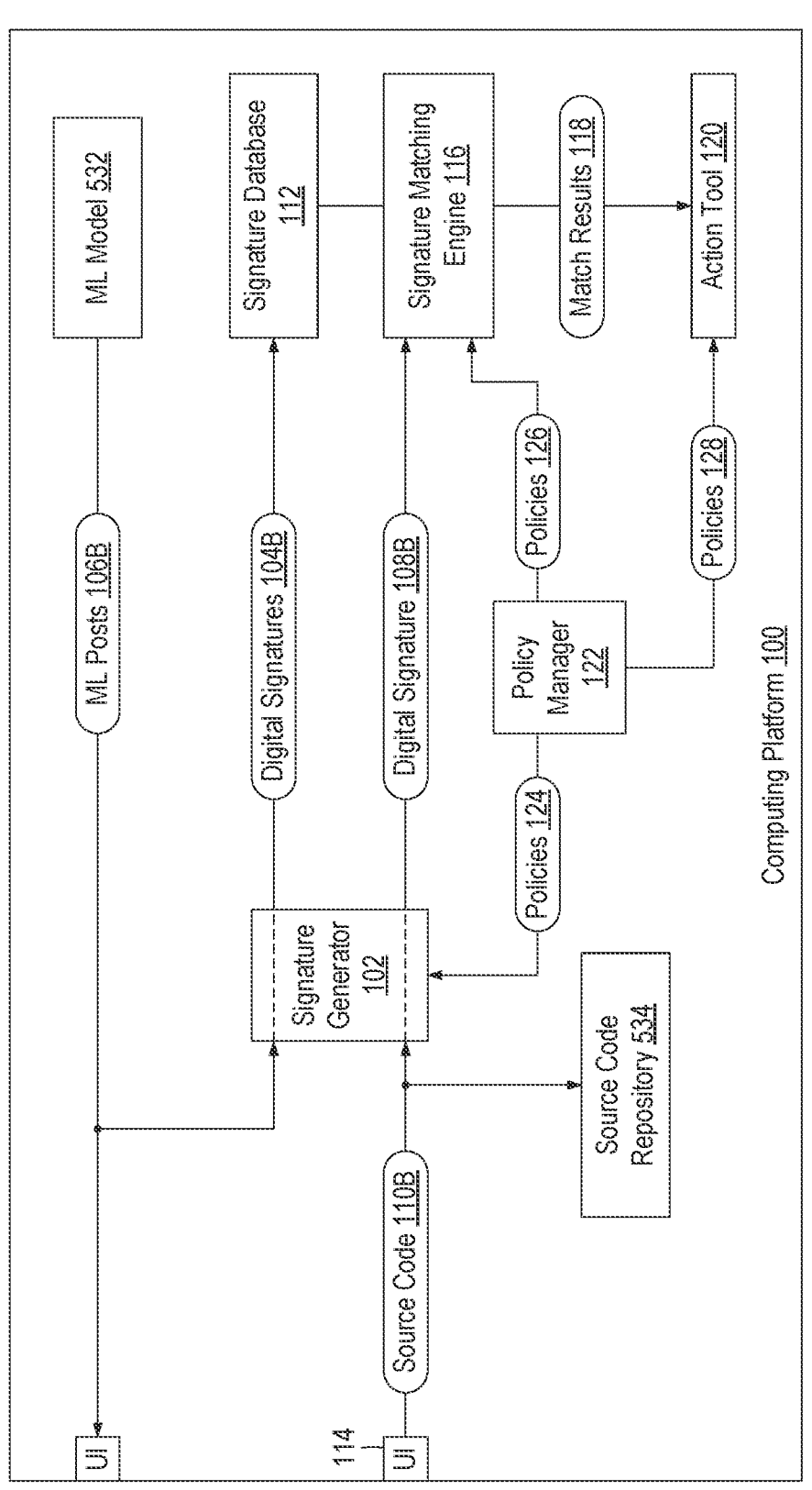
FIG. 5 is another block diagram of the computing platform, according to an embodiment.

FIG. 5 is another block diagram of computing platform 100, according to an embodiment. In the example of FIG. 5, reference content 106 includes ML posts 106B of a machine-language (ML) model 532, and user content 110 includes source code 110B submitted to a source code repository 534.

In the example of FIG. 5, In the example of FIG. 5, ML model 532 is illustrated as part of computing platform 100. In another example, ML model 532 is hosted on another computing platform. Further in the example of FIG. 5, signature generator 102 may intercept source code 110B from UI 114 and/or may retrieve source code 110B from source code repository 534 (e.g., based on a routine/schedule and/or based on policies 124).

In an example, ML model 532 includes a generative AI model (e.g., an LLM) that is trained to generate source code, and ML posts 106B include ML-generated source code and/or responses to user queries regarding source code. The example of FIG. 5 may be useful to identify source code that contains ML posts, and to perform actions based on configurable policies. The example of FIG. 5 is described below with reference to FIG. 6.

Figure 6:
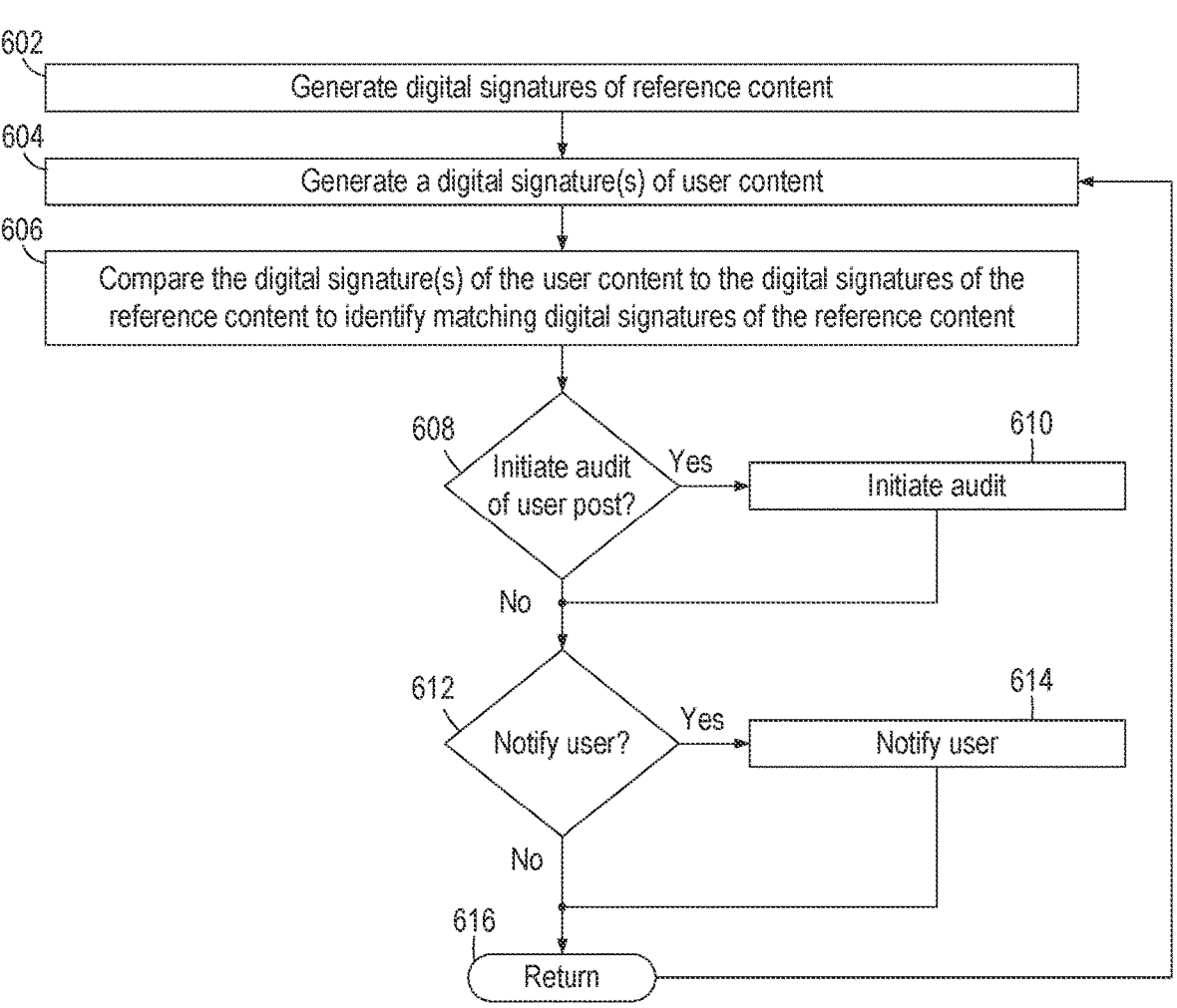
FIG. 6 illustrates another method of protecting intellectual property through the use of digital signatures, according to an embodiment.

FIG. 6 illustrates a method 600 of protecting intellectual property through the use of digital signatures, according to an embodiment. Method 600 is described below with reference to FIG. 5. Method 500 is not, however, limited to the example of FIG. 5.

At 602, signature generator 102 generates digital signatures 104B of ML posts 106B, such as described above with reference to 202 of method 200.

At 604, signature generator 102 generates a digital signature(s) 108B of source code 110B, such as described above with respect to 204 of method 200.

At 606, signature matching engine 116 compares digital signature(s) 108B of source code 110B to digital signatures 104B of ML posts 106B to identify matching digital signatures, such as described above with reference to 206 of method 200. Thereafter, action tool 120 may selectively perform one or more actions based on match results 118 and policies 128, examples of which are provided below with reference to 608 through 614.

At 608, action tool 120 may determine whether to initiate an audit of source code 110B, such as described above with reference to 410 of method 400. If action tool 120 determines to initiate an audit of source code 110B, processing proceeds to 610, where action tool 120 may capture information for the audit, such as described above with reference to 412 of method 400.

At 612, action tool 120 may determine whether to send a notification to UI 114 based on match results 118 and policies 128, such as described above with reference to 414 of method 400. If action tool 120 determines to send a notification, processing proceeds to 614.

At 614, action tool 120 sends a notification to UI 114. The notification may include a notice that source code 110B contains or likely contains ML posts.

At 616, processing may return to 604 for generation of digital signature(s) 108B of other source code submitted to source code repository 534, and/or to 602 for generation of digital signatures 104B of other proprietary content.

Another example is a method that includes generating digital signatures of proprietary content, intercepting user content of a network transmission directed to an external network, generating a digital signature of the user content, by the computing platform, comparing the digital signature of the user content to the digital signatures of the proprietary content to identify matching digital signatures of the proprietary content, and selectively performing an action based on the matching digital signatures and a configurable policy.

Another example is a non-transitory computer readable medium that includes stored instructions, which when executed by a processor, cause the processor to generate digital signatures of proprietary content, intercept user content of a network transmission directed to an external network, generate a digital signature of the user content, compare the digital signature of the user content to the digital signatures of the proprietary content to identify matching digital signatures of the proprietary content, and selectively perform an action based on the matching digital signatures and a configurable policy, where the action includes one or more of initiating an audit of the user content, sending a notification to a user interface indicating that the user content likely contains a portion of the proprietary content, releasing the transmission, and terminating the transmission.

Another example is a method that includes generating digital signatures of posts of a machine learning (ML) model, generating a digital signature of source code submitted to a source code repository, comparing the digital signature of the source code to the digital signatures of the posts of the ML model to identify matching digital signatures of the posts of the ML model, and selectively performing an action based on the matching digital signatures and a configurable policy, by the computing platform.

Figure 7:
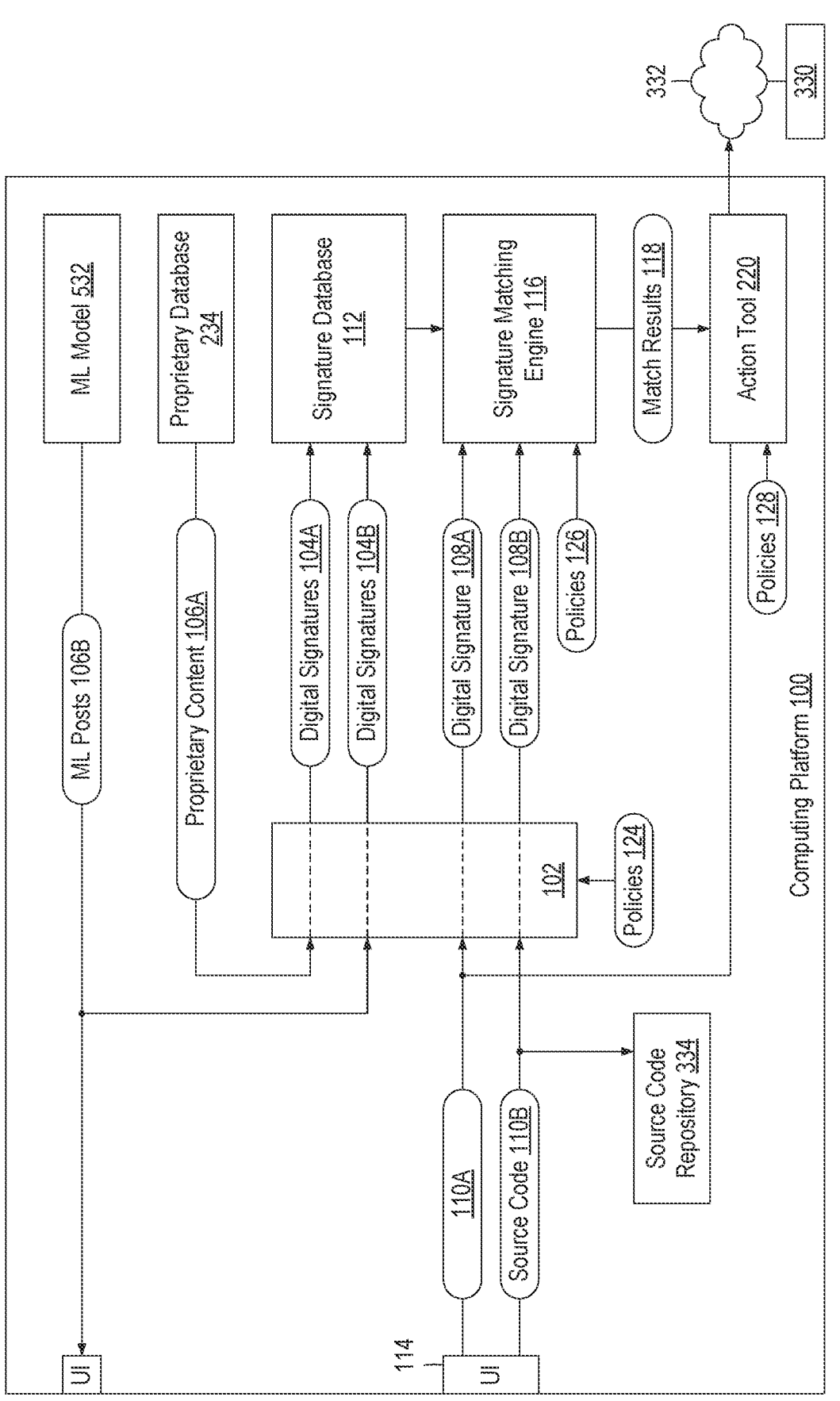
FIG. 7 is another block diagram of the computing platform, according to an embodiment.

FIG. 7 is another block diagram of computing platform 100, according to an embodiment. In the example of FIG. 7, reference content 106 includes proprietary content 106A and ML posts 106B, and user content 110 includes user post 110A and source code 110B. The example of FIG. 7 may be useful to identify user posts that contain proprietary source code and source code that contains posts of a ML model, and to take actions based on configurable policies.

Figure 8:
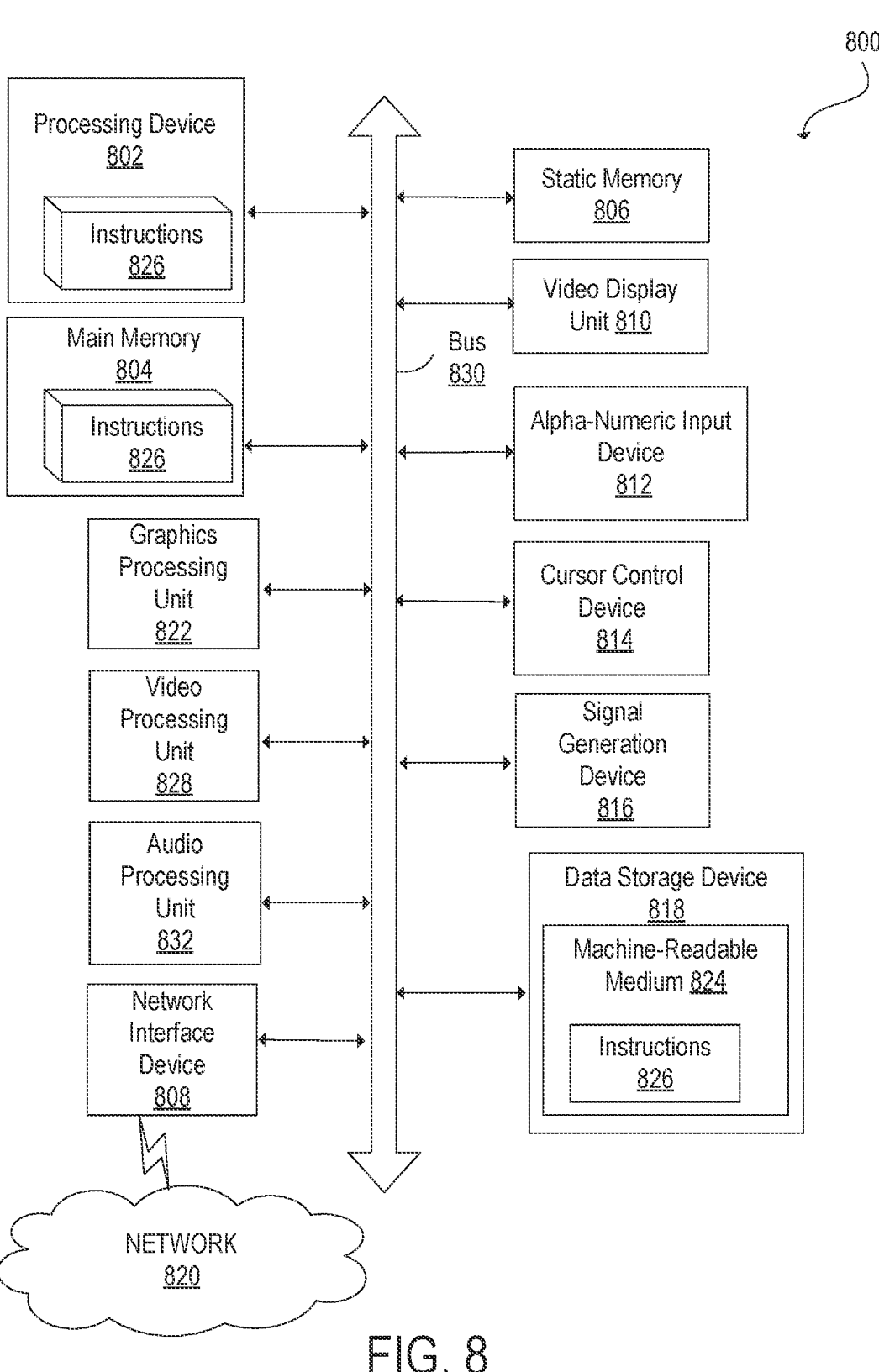
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:

generating reference digital signatures of first content;

intercepting second content of a network transmission directed to an external network;

generating a digital signature of the second content;

comparing, by a processing device, the digital signature of the second content to the reference digital signatures of the first content to identify matching digital signatures of the first content; and selectively performing an action based on the matching digital signatures and a policy, wherein selectively performing the action comprises initiating an audit of the second content if a number of the matching digital signatures meets a threshold of the policy.

2. The method of claim 1, wherein:

the second content comprises source code; and the external network comprises a generative artificial intelligence model (AIML).

3. The method of claim 1, wherein the initiating an audit comprises:

capturing one or more of, the second content, a user identifier associated with the second content, a time-stamp associated with the second content, the digital signature of the second content, the matching digital signatures, and the first content corresponding to the matching digital signatures.

4. The method of claim 1, further comprising one or more of:

generating the reference digital signatures and the digital signature of the second content based on a policy that specifies one or more of multiple methods of generating digital signatures;

generating the reference digital signatures and the digital signature of the second content based on a policy that specifies one or more levels of granularity at which to generate the digital signatures;

generating the reference digital signatures and the digital signature of the second content based on a content leakage risk identification policy;

generating the reference digital signatures and the digital signature of the second content based on a policy that specifies content types for which digital signatures are to be generated;

updating a database of the reference digital signatures based a policy that specifies one or more of an update frequency and an update schedule; and comparing the digital signature of the second content to the reference digital signatures of the first content based on a policy that specifies one or more levels of digital signature granularity at which to compare the digital signatures.

5. A method comprising:

generating reference digital signatures of first content;

intercepting second content of a network transmission directed to an external network;

generating a digital signature of the second content;

comparing, by a processing device, the digital signature of the second content to the reference digital signatures of the first content to identify matching digital signatures of the first content; and selectively performing an action based on the matching digital signatures and a policy, wherein selectively performing the action comprises sending a notification to a user interface indicating that the second content likely contains a portion of the first content if a number of the matching digital signatures meets a threshold of the policy.

6. A method comprising:

generating reference digital signatures of first content;

intercepting second content of a network transmission directed to an external network;

pausing the network transmission;

generating a digital signature of the second content while the network transmission is paused; and comparing, by a processing device, the digital signature of the second content to the reference digital signatures of the first content while the network transmission is paused to identify matching digital signatures of the first content; and selectively performing an action based on the matching digital signatures and a policy.

7. The method of claim 6, wherein the selectively performing an action comprises:

releasing the network transmission if a number of the matching digital signatures does not meet a threshold of the policy.

8. The method of claim 6, wherein the selectively performing an action comprises:

terminating the network transmission if a number of the matching digital signatures meets a threshold of the policy.

9. The method of claim 6, wherein the selectively performing an action comprises:

sending a notification to a user interface if a number of the matching digital signatures meets a threshold of the policy, wherein the notification comprises a notice that the second content likely contains a portion of the first content and one or more of a link to permit a user to release the network transmission and a link to permit the user to terminate the network transmission.

10. The method of claim 6, wherein the selectively performing an action comprises:

releasing the network transmission if a number of the matching digital signatures does not meet a first threshold of the policy;

initiating an audit of the second content if the number of the matching digital signatures meets the first threshold; and terminating the network transmission if the number of the matching digital signatures meets a second threshold of the policy, wherein the second threshold is higher than the first threshold.

11. The method of claim 10, wherein the selectively performing an action further comprises:

sending a notification to a user interface if the number of the matching digital signatures is between the first and second thresholds, wherein the notification comprises a notice that the second content likely contains a portion of the first content, a link to permit a user to release the network transmission, and a link to permit the user to terminate the network transmission.

12. A method comprising:

generating multiple reference digital signatures for a unit of first content at multiple respective levels of granularity based on features of the unit of the first content;

intercepting second content of a network transmission directed to an external network;

generating multiple digital signatures for the second content at the multiple respective levels of granularity based on features of the second content;

comparing one or more of the multiple reference digital signatures to one or more of the corresponding multiple digital signatures of the second content based on a policy, wherein the features of the unit of the first content and the features of the second content comprise one or more of snippets of the respective content, metadata of the respective content, and directory structure descriptors of the respective content; and selectively performing an action based on the matching digital signatures and the policy.

13. A non-transitory computer readable medium comprising stored instructions, which when executed by a processor, cause the processor to:

generate reference digital signatures of posts of a machine learning (ML) model;

generate a digital signature of source code submitted to a source code repository;

compare the digital signature of the source code to the reference digital signatures of the posts of the ML model to identify matching digital signatures of the posts of the ML model; and selectively perform an action based on the matching digital signatures and a policy, wherein selectively performing the action comprises initiating an audit of the source code if a number of the matching digital signatures meets a threshold of the policy.

14. The non-transitory computer readable medium of claim 13, wherein the stored instructions, when executed, further cause the processor to initiate the audit by:

capturing one or more of,
the source code,
a user identifier associated with the source code,
a time-stamp associated with the source code,
the digital signature of the source code,
the matching digital signatures, and
the ML posts corresponding to the matching digital signatures.

15. The non-transitory computer readable medium of claim 13, wherein the stored instructions, when executed, further cause the processor to selectively perform the action by:

initiating an audit of the source code and sending a notification to a user interface indicating that the source code likely contains a portion of the posts of the ML model, if a number of the matching digital signatures meets a threshold of the policy.

16. A non-transitory computer readable medium comprising stored instructions, which when executed by a processor, cause the processor to:

generate reference digital signatures of posts of a machine learning (ML) model;

generate a digital signature of source code submitted to a source code repository;

compare the digital signature of the source code to the reference digital signatures of the posts of the ML model to identify matching digital signatures of the posts of the ML model; and selectively perform an action based on the matching digital signatures and a policy, wherein selectively performing the action comprises sending a notification to a user interface indicating that the source code likely contains a portion of the ML posts if a number of the matching digital signatures meets a threshold of the policy.

17. A system comprising:
a memory storing instructions; and a processor, coupled with the memory and to execute the instructions, the instructions when executed cause the processor to:

generate reference digital signatures of first content;

intercept second content of a network transmission directed to an external network;

generate a digital signature of the second content;

compare the digital signature of the second content to the reference digital signatures of the first content to identify matching digital signatures of the first content;

selectively performing an action based on the matching digital signatures matching digital signatures of the first content and a policy;

generate reference digital signatures of posts of a machine learning (ML) model;

generate a digital signature of source code submitted to a source code repository;

compare the digital signature of the source code to the reference digital signatures of the posts of the ML model to identify matching digital signatures of the posts of the ML model; and selectively perform an action based on the matching digital signatures of the posts of the ML and the policy.

18. The system of claim 17, wherein the action comprises one or more of:

releasing the network transmission if a first number of the matching digital signatures of the first content does not meet a first threshold;

initiating an audit of the second content if the first number of the matching digital signatures of the first content meets the first threshold;

sending a notification to a user interface indicating that the second content likely contains a portion of the first content if the first number of the matching digital signatures of the first content meets the first threshold;

terminating the network transmission if the first number of the matching digital signatures of the first content meets a second threshold;

initiating an audit of the source code if a second number of the matching digital signatures of the posts of the ML model meets a third threshold; and sending a notification to a user interface indicating that the source code likely contains a portion of the ML posts if the second number of the matching digital signatures of the posts of the ML model meets the third threshold.

* * * * *